United States Patent [19]

Pohl et al.

[11] 3,833,423

[45] Sept. 3, 1974

[54] FUEL CELL WITH WC CATALYST-MATERIAL PROTECTION

[75] Inventors: Franz Arthur Pohl, Gotzenhain; Harald Bohm, Oberursel, both of Germany

[73] Assignee: Licentia Patent-Verwaltungs-G.m.b.H., Frankfurt am Main, Germany

[22] Filed: Sept. 20, 1971

[21] Appl. No.: 182,144

[30] Foreign Application Priority Data
Sept. 19, 1970 Germany.............................. 2046319

[52] U.S. Cl. ............. 136/86 D, 136/86 E, 136/112, 136/120 FC
[51] Int. Cl. ..................... H01m 27/04, H01m 11/00
[58] Field of Search ...................... 136/86, 112, 120; 75/.5 AA; 117/6; 148/6

[56] References Cited
UNITED STATES PATENTS

| | | | |
|---|---|---|---|
| 1,402,070 | 1/1922 | Hoppie .............................. | 136/112 |
| 2,811,456 | 10/1957 | Coleman et al...................... | 117/6 X |
| 2,991,188 | 7/1961 | Wing et al. .......................... | 117/6 X |
| 3,160,950 | 12/1964 | O'Sullivan, Jr. et al. ........... | 117/6 X |
| 3,305,403 | 2/1967 | Corso, Jr. et al. ............. | 136/120 FC |
| 3,346,421 | 10/1967 | Thompson et al. ............ | 136/120 FC |
| 3,352,718 | 11/1967 | Carson, Jr. et al. ............. | 136/112 X |
| 3,380,856 | 4/1968 | Pohl............................... | 136/120 FC |
| 3,531,327 | 9/1970 | Moos ................................ | 136/86 A |

OTHER PUBLICATIONS

J. Electrochem. Soc. 1970, 117–1, pp. 137–9, Robbins et al. "Stabilization of Small Pyrophoric Iron Particles by Surface Polymerization."

*Primary Examiner*—A. B. Curtis
*Attorney, Agent, or Firm*—Spencer & Kaye

[57] ABSTRACT

Autoxidizable fuel cell catalyst material is covered after its production with a substance protecting it against autoxidation. The substance is then removed before placing the fuel cell in operation.

17 Claims, No Drawings

FUEL CELL WITH WC CATALYST-MATERIAL PROTECTION

BACKGROUND OF THE INVENTION

The present invention relates to a method for preventing the autoxidation of highly active catalyst material used for fuel cell electrodes and to a fuel cell electrode utilizing such method.

Tungsten carbide is an example of a catalyst material used for the anodic oxidation of hydrogen in fuel cells operating with acid electrolytes. To produce porous gas diffusion electrodes, tungsten carbide of small particle size is bonded together with a thermoplastic. The production of the tungsten carbide itself can be accomplished by a number of different methods. For example, it is known to produce tungsten carbide by reacting tungsten powder or powdered tungsten oxides with activated carbon or to carburize tungsten powder or powdered tungsten oxides with hydrocarbon.

However, the catalytic activity producible by these known processes is too small for economical use in fuel cells. The catalytic activity can only be increased by providing the catalyst in the form of autoxidizable or pyrophoric material. For a long time, many difficulties have been occurring in producing electrodes of autoxidizable material. The catalyst material could only be held incapable of reaction during the entire time of the production process by special expensive techniques. The process has been carried out under a protective gas atmosphere, making considerable expense and significant production times unpreventable.

SUMMARY OF THE INVENTION

An object of the present invention, therefore, is to provide a method of making a fuel cell eliminating the autoxidation of catalyst material, the method being distinguished by simple process steps and small costs.

Another object is to provide a fuel cell electrode suitable for use in practicing the method of the invention.

These as well as other objects which will become apparent in the discussion that follows are achieved, according to the present invention, by covering the fine-grained, autoxidizable catalyst-material directly after its production with a substance protecting against autoxidation. Just before placing the fuel cell in operation, the substance is removed from the catalyst material to bare the catalyst material for contact with a fuel cell reactant for which it is catalytic.

DESCRIPTION OF THE PREFERRED EMBODIMENTS

The autoxidizable catalyst material, which can be, for example, tungsten carbide produced from tungsten or tungsten oxide carburized using carbon monoxide in a rotary oven or in a fluidized bed, is coated in a flask using a coating substance dissolved in a solvent, for example alcohol. The solvent is subsequently removed in a rotary evaporator at room temperature under vacuum. The surface of the catalyst material is then protected against autoxidation. The protective substance is difficultly volatile and may exhibit reducing properties. The single catalyst particles are coated or encapsulated by the substance. The catalyst material can then be stored and later worked into electrodes.

First choices for practicing the method of the invention are organic substances. Those substances which have proven to be especially advantageous are hydroquinone ($C_6H_4(OH)_2$), metaldehyde (($C_2H_4O)_4$), and polyoxymethylene ($OH(CH_2O)_nH$). Favorable compositions of substance and solvent are as follows: For hydroquinone, 1 to 70 grams of hydroquinone per liter of methanol, with a composition of 50 grams hydroquinone per liter of methanol being preferred; for metaldehyde, in the order of 0.5 to 30 grams of metaldehyde per liter of methanol, with 20 grams of metaldehyde per liter of methanol being preferred; for polyoxymethylene so much polyoxymethylene is added to methanol, that a saturated solution is produced.

The removal of these substances from the catalyst material after it has been formed into fuel cell electrodes is effected just before placing the fuel cell in operation. Removal can be obtained using a number of different techniques, depending on the particular substances being used.

For example, the electrodes can be immersed in alcohol to dissolve the coating; that is, repeated rinsing with alcohol separates the substance, for instance hydroquinone, from the electrodes. The electrodes are then built into fuel cells while still wet with alcohol.

The protective coating can, however, be removed after the assembly of the electrodes to fuel cells. To this end, alcohol is pumped through the electrolyte chambers of the cells until the substance has been completely dissolved away.

In the case of some protective coatings, for example those of metaldehyde, it is easier to effect removal by heating the coating substance to drive it off of the catalyst material. Thus, separation of the protective coating proceeds during the final sintering of the finished electrodes. The metaldehyde sublimates at 150°C. In order to prevent an autoxidation of the sintered electrodes when removing them from the oven, the electrodes are immediately soaked with an alcohol when they are removed after having cooled down. It is preferred for this purpose to use a higher alcohol, for example butanol, or a polyhydric alcohol, such as glycerin, which is not so easily volatile, so that a greater time is available for the assembly of the electrodes to fuel cells.

It is especially advantageous to remove the protective coating in already assembled fuel cells by electrochemical oxidation. Polyoxymethylene is, for example, suited for this technique. After the entire manufacturing process and after assembly of the fuel cells, the electrolyte chambers are filled with the electrolyte, for example 2-normal $H_2SO_4$, and the gas chambers provided with $H_2$ and $O_2$. The $H^+$-ions of the electrolyte lead to a break-down of the polyoxymethylene into monomeric formaldehyde. The formaldehyde is in turn electrochemically oxidized on the tungsten carbide electrodes with the production of electrical current. The oxidation product is carbon dioxide, which is given off to the surroundings. After the polyoxymethylene has been used up, i.e. after the formaldehyde has all been electrochemically burned, the cell works subsequently on a pure hydrogen-oxygen ($H_2/O_2$) basis. In this way, the step of removing the protective coating is automatically effected upon setting the fuel cell in operation, since the protective coating acts in the cell as a fuel.

The metaldehyde which has been used has been supplied by Fa. Schuchardt of Munich, Germany.

The polyoxymethylene used, which is also termed paraformaldehyde, has been supplied by Fa. Merk of Darmstadt, Germany, and has a decomposition point of 140° to 150°C, is slightly soluble in hot water, and soluble in alcohol.

According to the broader concept of the present invention, any substance which forms a film on catalyst material and bars oxygen from reaching the surface of the catalyst material is suitable for practicing the invention. The thickness of the film is in general less important than the ability of the substance to form a complete film covering the entire surfaces of the particles of catalyst material.

In general, catalyst materials become autoxidizable as their grain size is decreased.

An example of an autoxidizable catalyst material is WC produced using CO according to the teachings of U.S. Pat. application Ser. No. 880,898, filed Nov. 28th, 1969, by Harald Böhm, for an "Electrode Material". WC becomes more strongly autoxidizable as its particle size is decreased. Small particle size means increased activity. A preferred particle size for autoxidizable WC is about 0.01 microns.

Other autoxidizable catalyst materials are $MoS_2$ and $WS_2$, such as are treated in U.S. Pat. application Ser. No. 6883, filed Jan. 29th, 1970, by Franz Arthur Pohl et al., for an "Electrode." Since aldehydes can also be oxidized on these materials, they correspond to tungsten carbide with reference to surface protection using the named substances $C_6H_4(OH)_2$, metaldehyde, and polyoxymethylene.

Further illustrative of the present invention are the following examples:

EXAMPLE I

One-thousand grams of WC are suspended in 250 milliliters of a room-temperature solution having a composition of 50 grams of $C_6H_4(OH)_2$ per liter of $CH_3OH$. The $CH_3OH$ is then directly evaporated at room temperature in a rotary evaporator under vacuum. To prepare electrodes, a mixture consisting of 50 vol.-percent of the resulting, coated WC particles, 30 vol.-percent powdered activated carbon, and 20 vol.-percent polyethylene is prepared. The mixture is pressed at $0.55 \times 10^6$ ponds per $cm^2$ to discs having a thickness of 3 mm and an area of 9 $cm^2$. These discs are then sintered for 30 minutes at 150°C. The thus-prepared gas-porous electrodes are then assembled into fuel cells, for example in the manner set forth in U.S. Pat. application Ser. No. 886,154, filed Dec. 18th, 1969, now U.S. Pat. No. 3,706,602, by Harald Böhm et al., for an "Electrical Contact," corresponding to German Patent Application No. P 18 15 690.6. Finally, the $C_6H_4(OH)_2$ is removed by circulating methanol through the electrolyte chambers and channels of the fuel cells for about 3 hours.

EXAMPLE II

One-thousand grams of WC are suspended in 500 ml of solution of metaldehyde in $CH_3OH$ or $C_2H_5OH$ saturated at 60°C. The solvent is then removed in a rotary evaporator under vacuum. The electrodes are made as in Example I. During the sintering process, the metaldehyde sublimates. Following sintering, the electrodes are soaked under a protective gas atmosphere with butanol or glycerin. The electrodes are then immediately assembled, while still wet with the alcohol, into fuel cells. Remaining alcohol is then removed by solution in the electrolyte.

EXAMPLE III

The application of polyoxymethylene to WC particles proceeds as in Examples I and II. A saturated solution of polyoxymethylene in $CH_3OH$ is used. During sintering of the electrodes as in Example I, there is a partial breakdown and sublimation of the polyoxymethylene. The polyoxymethylene still remaining after the sintering, and protecting the catalyst material, is changed, after assembly and setting into operation of the fuel cells, by the acid electrolyte ($H^+$-ions) into monomeric formaldehyde. This formaldehyde is electrochemically burned on the anodes to produce electrical current.

EXAMPLE IV

The coatings of the above Examples are removed before or after assembly of the electrodes into fuel cells by soaking the electrodes at room temperature in methanol for about 24 hours, followed by repeated washing in clean $CH_3OH$. Where the electrodes are treated for removal of the coating before assembly into fuel cells, assembly proceeds while the electrodes are still wet with alcohol.

The success of the present invention is illustrated by the fuel cell data in the following table:

| Polarization Voltage | | 100mV | 200mV |
| --- | --- | --- | --- |
| Unprotected Electrode | $i =$ | 60mA/cm$^2$ | 140mA/cm$^2$ |
| Electrode Treated per Invention | $i =$ | 95mA/cm$^2$ | 225mA/cm$^2$ |

It will be understood that the above description of the present invention is susceptible to various modifications, changes and adaptations, and the same are intended to be comprehended within the meaning and range of equivalents of the appended claims.

We claim:

1. In a method of making a fuel cell, the improvement comprising the steps of producing a particulate, autoxidizable WC catalyst-material; covering the particles of said catalyst-material with a substance for preventing their autoxidation; forming the covered catalyst-material into a fuel cell electrode; assembling said electrode into a fuel cell; removing said substance from the catalyst-material of the assembled electrode; and bringing the catalyst-material bared in the step of removing into contact with a fuel cell reactant for which it is catalytic.

2. In a method of making a fuel cell, the improvement as claimed in claim 1, wherein the step of covering comprises suspending said catalyst-material in a solution of said substance and subsequently removing only the solvent.

3. In a method of making a fuel cell, the improvement as claimed in claim 2, wherein the solvent is an alcohol.

4. In a method of making a fuel cell, the improvement as claimed in claim 3, wherein said substance is hydroquinone.

5. In a method of making a fuel cell, the improvement as claimed in claim 4, wherein said alcohol is methanol and said solution contains 1 to 70 grams of hydroquinone per liter of methanol.

6. In a method of making a fuel cell, the improvement as claimed in claim 5, wherein said solution contains 50 grams of hydroquinone per liter of methanol.

7. In a method of making a fuel cell, the improvement as claimed in claim 3, wherein said substance is metaldehyde.

8. In a method of making a fuel cell, the improvement as claimed in claim 7, wherein said alcohol is methanol and said solution contains 0.5 to 30 grams of metaldehyde per liter of methanol.

9. In a method of making a fuel cell, the improvement as claimed in claim 8, wherein said solution contains 20 grams metaldehyde per liter of methanol.

10. In a method of making a fuel cell, the improvement as claimed in claim 3, wherein said substance is polyoxymethylene.

11. In a method of making a fuel cell, the improvement as claimed in claim 10, wherein said solution is methanol saturated with polyoxymethylene.

12. In a method of making a fuel cell, the improvement as claimed in claim 1, wherein said substance is soluble in alcohol and the step of removing comprises dissolving said substance in alcohol.

13. In a method of making a fuel cell, the improvement as claimed in claim 12, wherein the step of removing further includes pumping the alcohol through an electrolyte chamber of the fuel cell.

14. In a method of making a fuel cell, the improvement as claimed in claim 1, wherein said step of removing includes electrochemically oxidizing said substance.

15. In a method of making a fuel cell, the improvement as claimed in claim 1, wherein the step of covering comprises suspending the WC catalytic material in a room-temperature solution of $C_6H_4(OH)_2$ in $CH_3OH$ in the ratio 1000 grams WC per 250 milliliters of solution containing 50 grams $C_6H_4(OH)_2$ per liter $CH_3OH$ and evaporating the $CH_3OH$ at room temperature in a rotary evaporator; and wherein the step of removing comprises circulating methanol through the fuel cell for 3 hours.

16. In a method of making a fuel cell, the improvement as claimed in claim 1, wherein the step of covering comprises suspending the WC catalytic material in a saturated solution of polyoxymethylene in $CH_3OH$ and evaporating the $CH_3OH$ at room temperature in a rotary evaporator; and wherein the step of removing comprises changing polyoxymethylene coating into monomeric formaldehyde by the action of an acid electrolyte, and electrochemically burning the formaldehyde on an anode of the fuel cell to produce electrical current.

17. In a fuel cell, a fuel cell electrode comprising a particulate, autoxidizable WC catalyst-material and a polyoxymethylene coating on the particles of said material for preventing their autoxidation, said polyoxymethylene being removed from said material by electrochemical oxidation in contact with the fuel cell electrolyte upon initial operation of the fuel cell.

* * * * *